United States Patent
Pratt et al.

(10) Patent No.: US 8,516,534 B2
(45) Date of Patent: Aug. 20, 2013

(54) METHOD AND APPARATUS FOR MODEL-BASED RECOVERY OF PACKET LOSS ERRORS

(75) Inventors: James Pratt, Round Rock, TX (US); Marc Sullivan, Austin, TX (US); Keith Crowe, Cedar Park, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 1112 days.

(21) Appl. No.: 12/429,978

(22) Filed: Apr. 24, 2009

(65) Prior Publication Data

US 2010/0275237 A1    Oct. 28, 2010

(51) Int. Cl.
*H04N 7/16* (2011.01)
*H04N 7/12* (2006.01)
*G09G 5/00* (2006.01)

(52) U.S. Cl.
USPC .................... 725/116; 375/240.27; 345/629

(58) Field of Classification Search
None
See application file for complete search history.

(56) References Cited

U.S. PATENT DOCUMENTS

| 5,462,275 | A | 10/1995 | Lowe et al. |
| 5,850,352 | A | 12/1998 | Moezzi et al. |
| 6,041,056 | A * | 3/2000 | Bigham et al. ........... 370/395.64 |
| 2006/0095944 | A1 | 5/2006 | Domircin et al. |
| 2007/0053513 | A1 | 3/2007 | Hoffberg |
| 2008/0077954 | A1* | 3/2008 | Cohen et al. .................... 725/32 |

FOREIGN PATENT DOCUMENTS

| WO |   | 0239666 A2 | 5/2002 |
| WO | WO2008075256 | * | 6/2008 |

* cited by examiner

*Primary Examiner* — Brian Pendleton
*Assistant Examiner* — Jason K Lin
(74) *Attorney, Agent, or Firm* — Guntin & Gust, PLC; Jay H. Anderson

(57) ABSTRACT

A media processor having a controller operable to recognize a portion of a video stream in an Interactive TV (iTV) network having video compression artifacts corresponding to a stored model and perform model-based video correction of the portion recognized using synthetically generated images of objects in a captured video scene. Other embodiments are disclosed.

25 Claims, 4 Drawing Sheets

400

METHOD AND APPARATUS FOR MODEL-BASED RECOVERY OF PACKET LOSS ERRORS

FIELD OF THE DISCLOSURE

The present disclosure relates generally to video synthesis and more specifically to model-based recovery of packet loss errors.

BACKGROUND

With the advent of various versions of Digital Subscriber Line (xDSL) technology, service providers are now able to provide broadband services to residences and commercial establishments over twisted pair lines. Broadband services can include Internet service, telephony, and interactive Television (iTV). In the case of iTV or IPTV services, the service provider typically provides access to media stored on a back-end server as provided by a distribution source. The media may be captured live video that is reproduced and subsequently distributed on the iTV or IPTV network.

Video encoding or compression is a mathematically intensive process that uses a variety of techniques to take an original source video and create a representation that is then decoded. The quality of the video presented on a media presentation device such as a television is typically assessed according to how closely the decompressed video matches the original source video. The extent of the similarity of the reproduction is generally a driving force of current approaches to video compression.

When an unrecoverable packet loss occurs in the transmission of a compressed video file, a defect is rendered. Defects are highly noticeable and can degrade the consumers experience. To mitigate defects, a variety of "concealment" techniques can be used in video decoders. These techniques currently include frame duplication, blurring, and averaging nearby pixel attributes over the missing visual portion of the rendered video, which can help conceal or reduce the impact of missing data packets on the perceived quality of the decoded stream.

DETAILED DESCRIPTION

One embodiment of the present disclosure can entail a method at a set top box (STB) comprising recognizing a portion of a video stream in an Internet Protocol TV (IPTV) network having video compression artifacts corresponding to a stored model, model-based video correction of the portion recognized using synthetically generated images of objects in a captured video scene, and delivering to a presentation device the corrected portion of the video stream over a low bit rate connection.

Another embodiment of the present disclosure can entail a computer-readable storage medium at a server comprising computer instructions to synthesize video using model-based video correction to provide a higher quality image for correcting defects in captured video.

Yet another embodiment of the present disclosure can entail a media processor comprising a controller to recognize a portion of a video stream in an Interactive TV (iTV) network having video compression artifacts corresponding to a stored model and model-based video correction of the portion recognized using synthetically generated images of objects to correct defects in a captured video scene.

Yet another embodiment of the present disclosure can entail a server comprising a controller to recognize within a captured video a predetermined amount of compression artifacts for a portion of video for an object having a stored corresponding model for the object and synthesize the portion of the video using model-based video correction according to a stored model of replacement images.

Figure 1:
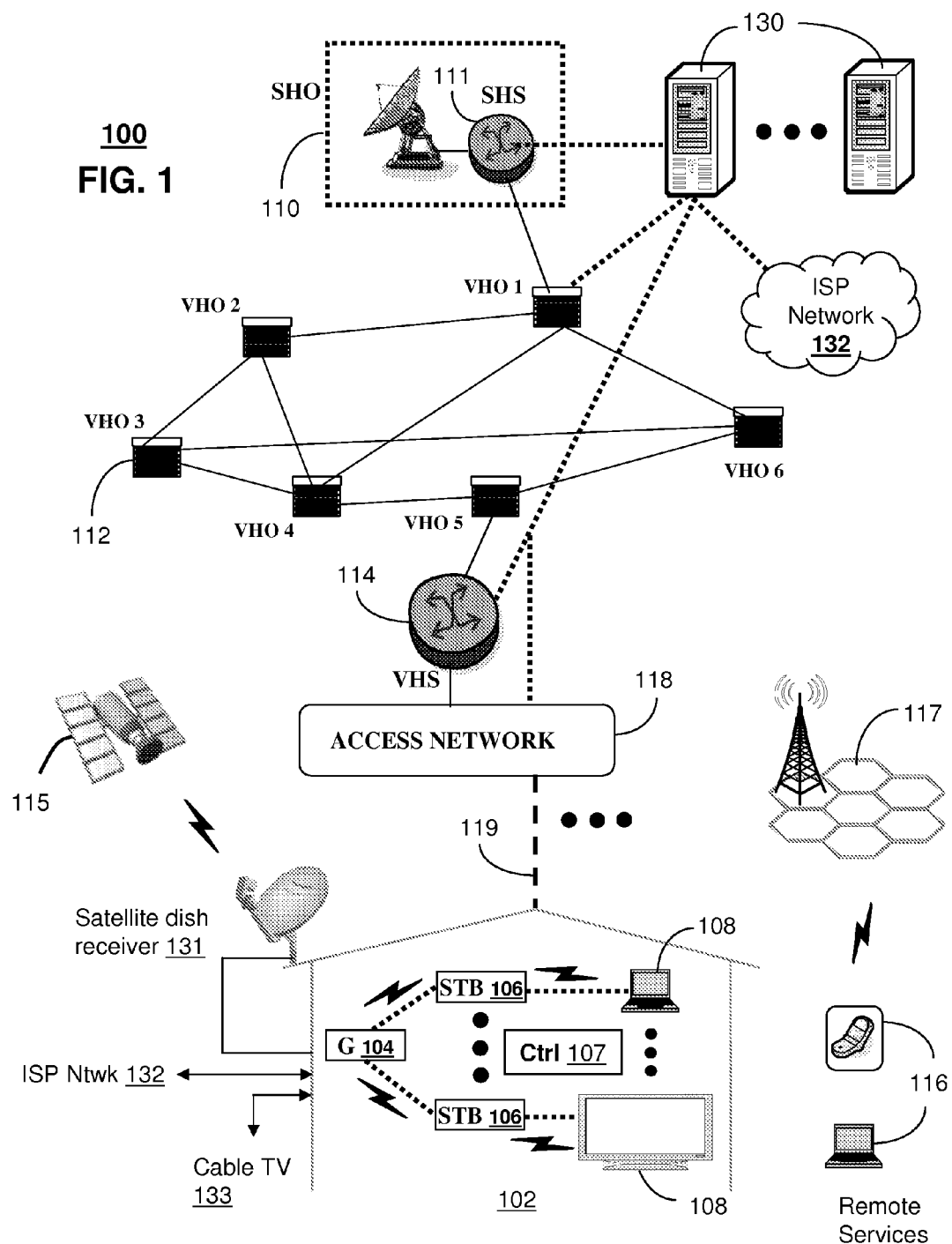
FIG. 1 depicts an illustrative embodiment of a communication system.

FIG. 1 depicts an illustrative embodiment of a first communication system 100 for delivering media content. The communication system 100 can represent an Internet Protocol Television (IPTV) broadcast media system. The IPTV media system can include a super head-end office (SHO) 110 with at least one super headend office server (SHS) 111 which receives media content from satellite and/or terrestrial communication systems. In the present context, media content can represent audio content, moving image content such as videos, still image content, or combinations thereof. The SHS server 111 can forward packets associated with the media content to video head-end servers (VHS) 114 via a network of video head-end offices (VHO) 112 according to a common multicast communication protocol.

The VHS 114 can distribute multimedia broadcast programs via an access network 118 to commercial and/or residential buildings 102 housing a gateway 104 (such as a common residential or commercial gateway). The access network 118 can represent a group of digital subscriber line access multiplexers (DSLAMs) located in a central office or a service area interface that provide broadband services over optical links or copper twisted pairs 119 to buildings 102. The gateway 104 can use common communication technology to distribute broadcast signals to media processors 106 such as Set-Top Boxes (STBs) which in turn present broadcast channels to media devices 108 such as computers or television sets managed in some instances by a media controller 107 (such as an infrared or RF remote control).

The gateway 104, the media processors 106, and media devices 108 can utilize tethered interface technologies (such as coaxial or phone line wiring) or can operate over a common wireless access protocol. With these interfaces, unicast communications can be invoked between the media processors 106 and subsystems of the IPTV media system for services such as video-on-demand (VoD), browsing an electronic programming guide (EPG), or other infrastructure services.

Some of the network elements of the IPTV media system can be coupled to one or more computing devices 130 a portion of which can operate as a web server for providing portal services over an Internet Service Provider (ISP) network 132 to wireline media devices 108 or wireless communication devices 116 by way of a wireless access base station 117 operating according to common wireless access protocols such as Wireless Fidelity (WiFi), or cellular communication technologies (such as GSM, CDMA, UMTS, WiMAX, Software Defined Radio or SDR, and so on).

Another distinct portion of the computing devices 130 can function as a server (herein referred to as server 130). The server 130 can use common computing and communication technology to perform the function of adjusting between a video quality and an audio quality in a Interactive Television (iTV) or an IPTV presentation in response to a user selection where the audio quality and the video quality are adjusted at the expense of each other as will be further described with respect to FIG. 4.

It will be appreciated by an artisan of ordinary skill in the art that a satellite broadcast television system can be used in place of the IPTV media system. In this embodiment, signals transmitted by a satellite 115 supplying media content can be intercepted by a common satellite dish receiver 131 coupled to the building 102. Modulated signals intercepted by the satellite dish receiver 131 can be submitted to the media processors 106 for generating broadcast channels which can be presented at the media devices 108. The media processors 106 can be equipped with a broadband port to the ISP network 132 to enable infrastructure services such as VoD and EPG described above.

In yet another embodiment, an analog or digital broadcast distribution system such as cable TV system 133 can be used in place of the IPTV media system described above. In this embodiment the cable TV system 133 can provide Internet, telephony, and interactive media services.

It follows from the above illustrations that the present disclosure can apply to any present or future interactive over-the-air or landline media content services.

Figure 2:
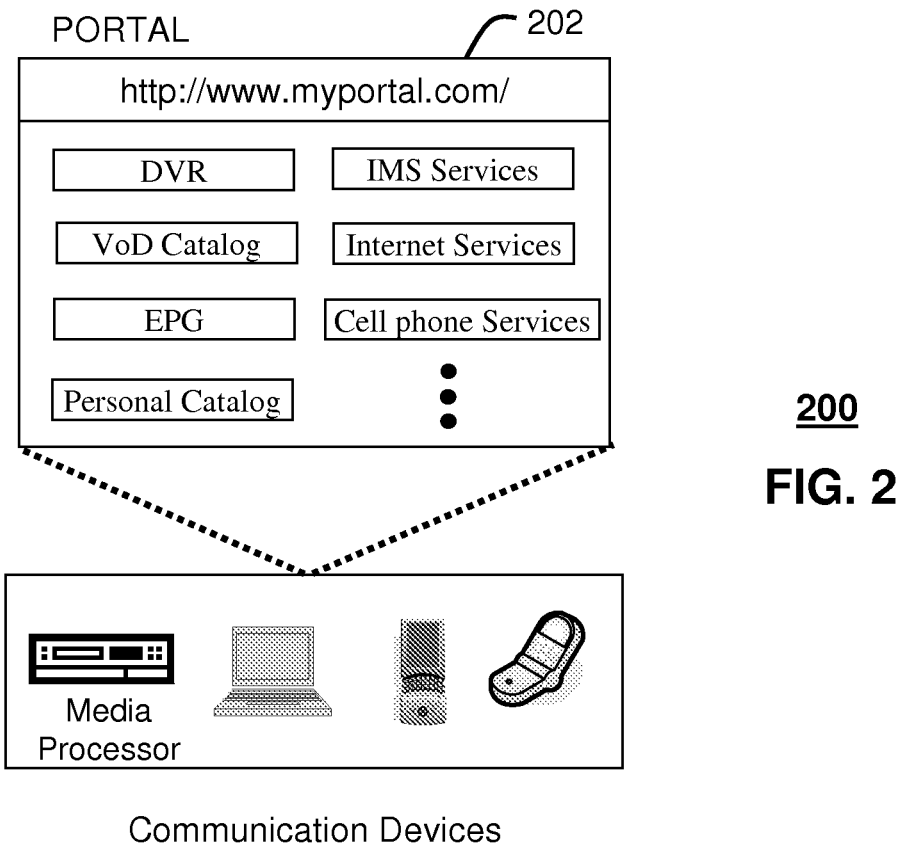
FIG. 2 depicts an illustrative embodiment of a portal interacting with the communication system of FIG. 1.

FIG. 2 depicts an illustrative embodiment of a portal 202 which can operate from the computing devices 130 described earlier of communication 100 illustrated in FIG. 1. The portal 202 can be used for managing services of communication systems 100-200. The portal 202 can be accessed by a Uniform Resource Locator (URL) with a common Internet browser such as Microsoft's Internet Explorer™ using an Internet-capable communication device such as those described for FIGS. 1-2. The portal 202 can be configured, for example, to access a media processor 106 and services managed thereby such as a Digital Video Recorder (DVR), a VoD catalog, an EPG, a personal catalog (such as personal videos, pictures, audio recordings, etc.) stored in the media processor, provisioning IMS services described earlier, provisioning Internet services, provisioning cellular phone services, and so on. The portal 202 can also be used to allocate the relative quality settings for video quality and audio quality as further described herein. Note that the video and quality settings can also be set at the media processor or set top box in other embodiments. In yet other embodiments, the quality settings can be set at either the media processor or the portal (or server).

Figure 3:
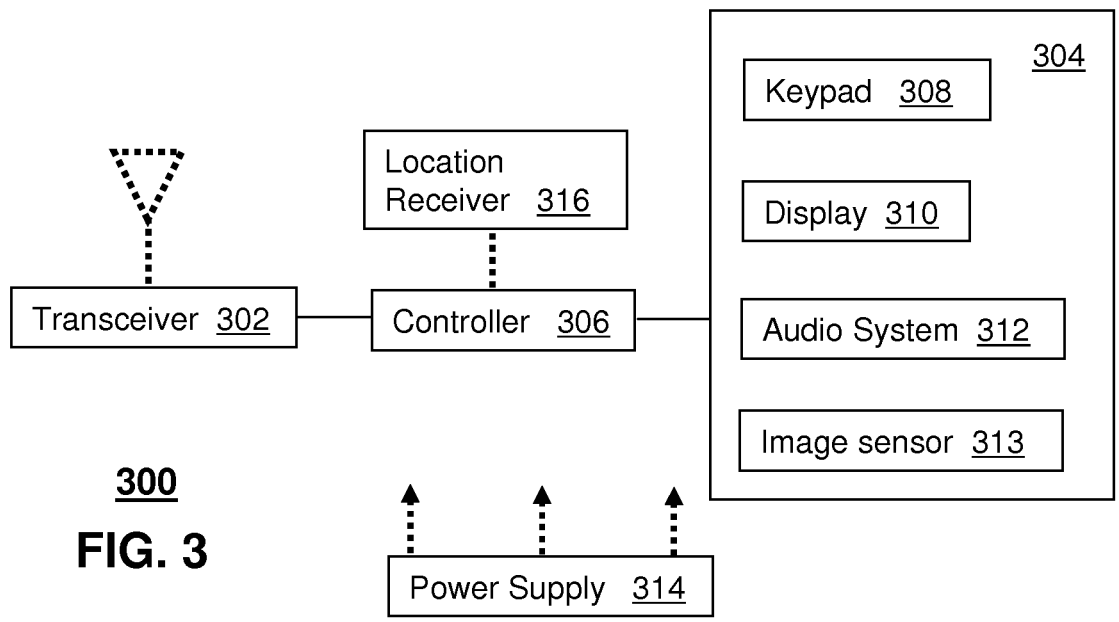
FIG. 3 depicts an illustrative embodiment of a communication device utilized in the communication system of FIG. 1.

FIG. 3 depicts an exemplary embodiment of a communication device 300. Communication 300 can serve in whole or in part as an illustrative embodiment of the communication devices of FIGS. 1-2. The communication device 300 can comprise a wireline and/or wireless transceiver 302 (herein transceiver 302), a user interface (UI) 304, a power supply 314, a location receiver 316, and a controller 306 for managing operations thereof. The transceiver 302 can support short-range or long-range wireless access technologies such as Bluetooth, WiFi, Digital Enhanced Cordless Telecommunications (DECT), or cellular communication technologies, just to mention a few. Cellular technologies can include, for example, CDMA-1X, UMTS/HSDPA, GSM/GPRS, TDMA/EDGE, EV/DO, WiMAX, SDR, and next generation cellular wireless communication technologies as they arise. The transceiver 402 can also be adapted to support circuit-switched wireline access technologies (such as PSTN), packet-switched wireline access technologies (such as TCPIP, VoIP, etc.), and combinations thereof.

The UI 304 can include a depressible or touch-sensitive keypad 308 with a navigation mechanism such as a roller ball, joystick, mouse, or navigation disk for manipulating operations of the communication device 300. The keypad 308 can be an integral part of a housing assembly of the communication device 300 or an independent device operably coupled thereto by a tethered wireline interface (such as a USB cable) or a wireless interface supporting for example Bluetooth. The keypad 308 can represent a numeric dialing keypad commonly used by phones, and/or a Qwerty keypad with alpha-numeric keys. The UI 304 can further include a display 310 such as monochrome or color LCD (Liquid Crystal Display), OLED (Organic Light Emitting Diode) or other suitable display technology for conveying images to an end user of the communication device 300. In an embodiment where the display 310 is touch-sensitive, a portion or all of the keypad 308 can be presented by way of the display.

The UI 304 can also include an audio system 312 that utilizes common audio technology for conveying low volume audio (such as audio heard only in the proximity of a human ear) and high volume audio (such as speakerphone for hands free operation). The audio system 312 can further include a microphone for receiving audible signals of an end user. The audio system 412 can also be used for voice recognition applications. The UI 304 can further include an image sensor 313 such as a charged coupled device (CCD) camera for capturing still or moving images.

The power supply 314 can utilize common power management technologies such as replaceable and rechargeable batteries, supply regulation technologies, and charging system technologies for supplying energy to the components of the communication device 300 to facilitate long-range or short-range portable applications. The location receiver 316 can utilize common location technology such as a global positioning system (GPS) receiver for identifying a location of the communication device 100 based on signals generated by a constellation of GPS satellites, thereby facilitating common location services such as navigation.

The communication device 100 can use the transceiver 302 to also determine a proximity to a cellular, WiFi or Bluetooth access point by common power sensing techniques such as utilizing a received signal strength indicator (RSSI) and/or a signal time of arrival (TOA) or time of flight (TOF). The controller 306 can utilize computing technologies such as a microprocessor, a digital signal processor (DSP), and/or a video processor with associated storage memory such a Flash, ROM, RAM, SRAM, DRAM or other storage technologies.

The communication device 300 can be adapted to perform the functions of the media processor 106, the media devices 108, or the portable communication devices 56 of FIG. 1. It will be appreciated that the communication device 300 can also represent other common devices that can operate in communication systems 100 of FIG. 1 such as a gaming console and a media player.

Figure 4:
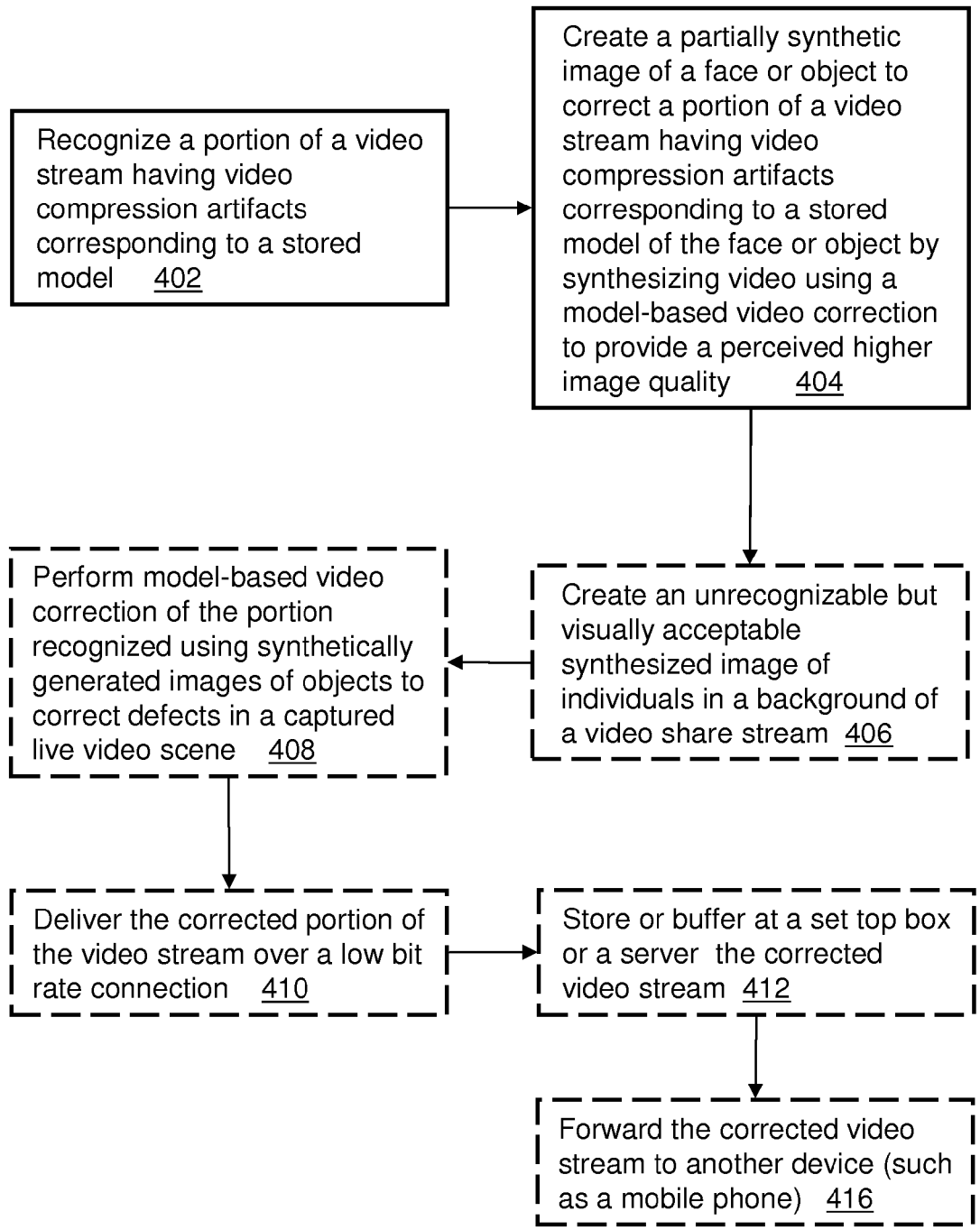
FIG. 4 depicts an illustrative embodiment of a method operating in portions of the communication system of FIG. 1.

FIG. 4 depicts an illustrative method 400 that operates in portions of the communication system of FIG. 1 such as at a media processor or set top box. Method 400 can begin at 402 in which a portion of a video stream is recognized (in an Internet Protocol TV (IPTV) or iTV network) having video compression artifacts corresponding to a stored model. The stored model can include images or video models for grass, faces, skies, mountains, and other backgrounds that can be modeled for the video correction purposes contemplated herein. The model-based video correction can be a physical model based enhancement to the video image. In this regard, the method can include creating at 404 a partially synthetic image of a face or object to correct a portion of a video stream having video compression artifacts corresponding to a stored model of the face or object. The corrected image can be synthesized video created using model-based video correction to provide a perceived higher image quality. The method can create at 406 unrecognizable but visually acceptable synthesized images of individuals in a background of a video share stream. These images can be made unrecognizable when they are in a background of a video share stream (rather than being the subject) and made unrecognizable enough to avoid a right of publicity claim. The method can then perform model-based video correction of the portion recognized at 408 using synthetically generated images of objects to correct defects in a captured live video scene. The corrected portion of the video stream can then be delivered at 410 over a low bit rate connection for example. Note that a set top box or a server coupled to a IPTV or iTV network can contain a library of stored models for use for the video enhancements or corrections contemplated herein. At 412, the corrected video stream can be stored or buffered at a set top box or a server and then forwarded to another device at 414 such as a mobile phone.

All of the known techniques (such as frame duplication, blurring, and averaging nearby pixel attributes) are general purpose techniques that will help conceal or reduce the impact of missing data packets on the perceived quality of a decoded stream, but they still provide less than ideal results, particularly in low bit rate schemes. A different approach as contemplated herein augments traditional encoding methods (such as h.264) to use model-based video correction. Instead of attempting to estimate as closely as possible the original source, the approach herein attempts to create a high quality experience by synthesizing the lost portions of the image rather than trying to duplicate the original source.

One of the most common use cases for video sharing is a kids soccer game. Panning across grass on the field is video compression intensive. Video of a pan across grass shows a lot of video compression artifacts at the level cell phones can handle. If the video, however, is recognized as a pan across grass, a model of grass can be placed over the grass on a server (or a set top box) in the middle of the video share stream. Such a technique would greatly increase the subjective quality of the video seen at the cell phone or mobile device. Synthetically generated images of objects such as grass are quite sophisticated, but can be computer generated as can other backgrounds and faces. The embodiments herein can use similar tools and apply them to correct defects in a captured live video scene that has been highly compressed.

Human faces are another area where model-based video compression correction could aid video sharing where there are cell data network bandwidth restrictions. Faces are easily recognized in videos and pictures. Common models for faces can be used to identify and correct defects that are due to compression artifacts. In a sense, a partially synthetic image of the face can be created. Current video decoded schemes do not use these types of adjustments because they are designed to be general purpose as noted above. Model based adjustments to video sequences could increase the quality of the certain types of videos delivered over a low bit rate connection.

Upon reviewing the aforementioned embodiments, it would be evident to an artisan with ordinary skill in the art that said embodiments can be modified, reduced, or enhanced without departing from the scope and spirit of the claims described below. For example, note that peoples' faces would generally look better than normal using these techniques. Additionally, the embodiments herein could be used to purposely make individuals that are not at the center of attention or the main subject in the video share stream look different enough as to not be recognizable. This can help avoid any right of publicity issues that can arise from recording famous individuals that happen to be in a background of a video for a commercial for example. This way, no endorsement can be implied. Note that the embodiments herein do not recreate or attempt to recreate the exact image captured, but create an image that viewers will find acceptable. Faces and grass are just two examples, and the embodiments herein are not limited to just these cases. Any physical model based enhancement to a video image can benefit from the embodiments.

Other suitable modifications can be applied to the present disclosure without departing from the scope of the claims below. Accordingly, the reader is directed to the claims section for a fuller understanding of the breadth and scope of the present disclosure.

Figure 5:
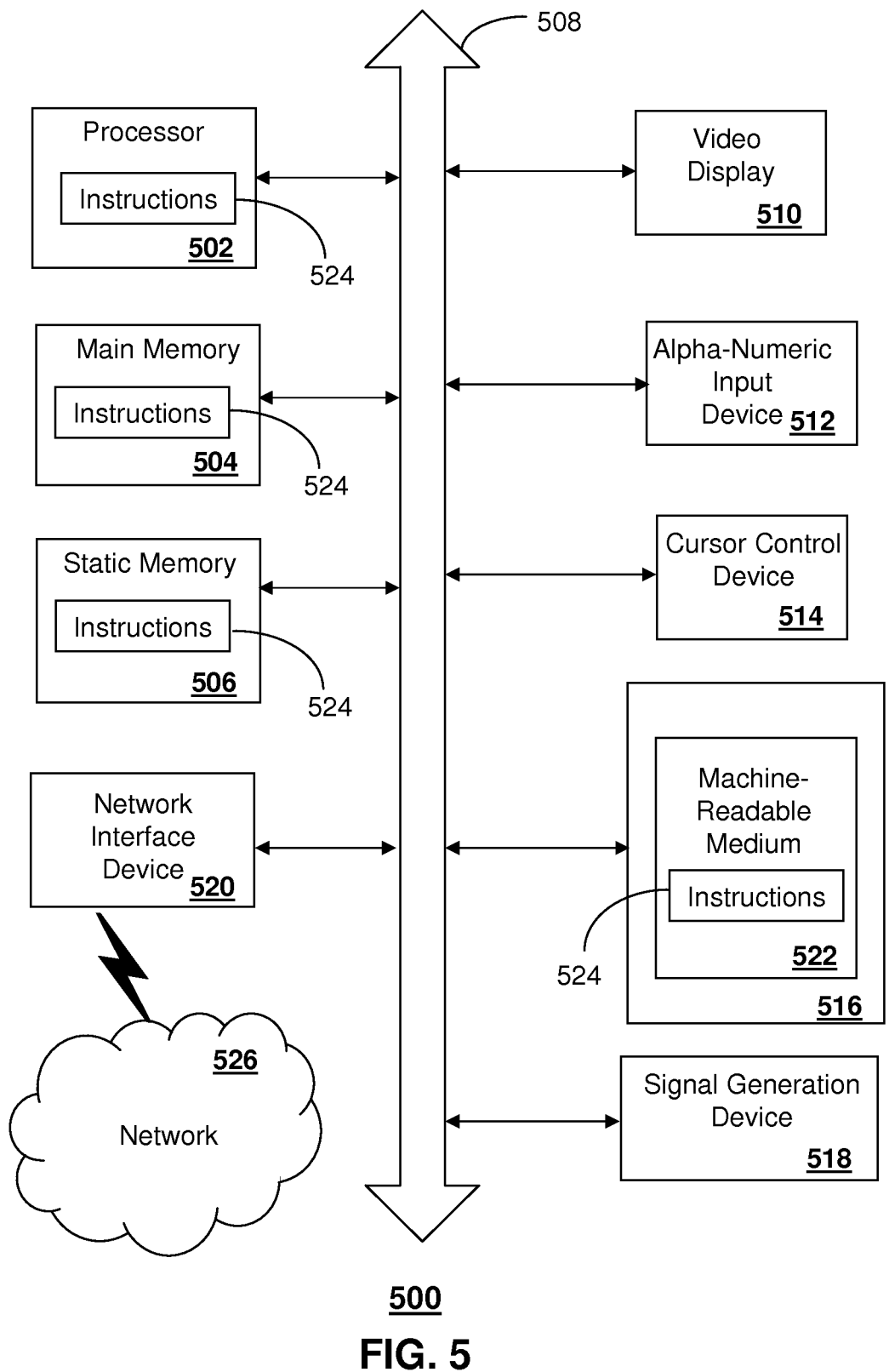
FIG. 5 is a diagrammatic representation of a machine in the form of a computer system within which a set of instructions, when executed, may cause the machine to perform any one or more of the methodologies discussed herein.

FIG. 5 depicts an exemplary diagrammatic representation of a machine in the form of a computer system 500 within which a set of instructions, when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. It will be understood that a device of the present disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methodologies discussed herein.

The computer system 500 may include a processor 502 (e.g., a central processing unit (CPU), a graphics processing unit (GPU, or both), a main memory 504 and a static memory 506, which communicate with each other via a bus 508. The computer system 500 may further include a video display unit 510 (e.g., a liquid crystal display (LCD), a flat panel, a solid state display, or a cathode ray tube (CRT)). The computer system 500 may include an input device 512 (e.g., a keyboard), a cursor control device 514 (e.g., a mouse), a disk drive unit 516, a signal generation device 518 (e.g., a speaker or remote control) and a network interface device 520.

The disk drive unit 516 may include a machine-readable medium 522 on which is stored one or more sets of instructions (e.g., software 524) embodying any one or more of the methodologies or functions described herein, including those methods illustrated above. The instructions 524 may also reside, completely or at least partially, within the main memory 504, the static memory 506, and/or within the processor 502 during execution thereof by the computer system 500. The main memory 504 and the processor 502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine readable medium containing instructions 524, or that which receives and executes instructions 524 from a propagated signal so that a device connected to a network environment 526 can send or receive voice, video or data, and to communicate over the network 526 using the instructions 524. The instructions 524 may further be transmitted or received over a network 526 via the network interface device 520.

While the machine-readable medium 522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure.

The term "machine-readable medium" shall accordingly be taken to include, but not be limited to: solid-state memories such as a memory card or other package that houses one or more read-only (non-volatile) memories, random access memories, or other re-writable (volatile) memories; magneto-optical or optical medium such as a disk or tape; and/or a digital file attachment to e-mail or other self-contained information archive or set of archives is considered a distribution medium equivalent to a tangible storage medium. Accordingly, the disclosure is considered to include any one or more of a machine-readable medium or a distribution medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same functions are considered equivalents.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, comprising:
   recognizing, by a set top box comprising a processor, a portion of a video stream in an Internet Protocol TV network having video compression artifacts corresponding to a stored model, the stored model including an image or a video model of an image background;
   performing, by the set top box, model-based video correction of the portion recognized using synthetically generated images of objects in a captured video scene; and
   delivering, by the set top box, to a presentation device a corrected portion of the video stream over a low bit rate connection,
   wherein the model-based video correction corresponds to synthetic replacement of the artifacts according to a stored model of replacement images, and
   wherein recognizing the portion of the video stream further comprises recognizing, within a captured video, a predetermined amount of compression artifacts for the portion of the video stream for an object having a stored corresponding model for the object.

2. The method of claim 1, wherein the stored model comprises images of grass, faces, skies, or mountains.

3. The method of claim 1, comprising creating a partially synthetic image of a face to correct a portion of a video stream having video compression artifacts corresponding to a stored model of the face.

4. The method of claim 1, comprising creating unrecognizable but visually acceptable synthesized images of individuals in a background of a video share stream.

5. The method of claim 4, comprising creating unrecognizable images of individuals in a background of a video share stream sufficient to avoid a right of publicity claim.

6. The method of claim 1, wherein the model-based video correction is a physical model based enhancement to a video image.

7. The method of claim 1, wherein the set top box contains a library of stored models, and wherein the presentation device corresponds to a cellular phone.

8. The method of claim 1, wherein a server contains a library of stored models retrieved by the set top box.

9. The method of claim 1, wherein the set top box uses a digital video recorder as a buffer for temporarily storing a corrected video stream.

10. The method of claim 1, comprising storing a corrected video stream at the set top box and forwarding the corrected video stream to a mobile phone.

11. A tangible computer-readable storage device, comprising computer instructions which, when executed by a processor, cause the processor to perform operations comprising:
   recognizing within a captured video, a predetermined amount of compression artifacts for a portion of video for an object having a stored corresponding model for the object, the stored model including an image or a video model of an image background; and
   synthesizing video using model-based video correction to provide a higher quality image for correcting defects in the captured video,
   wherein the model-based video correction corresponds to synthetic replacement of artifacts in the captured video according to a stored model of replacement images.

12. The tangible computer-readable storage device of claim 11, wherein the captured video includes compression artifacts from video that have been compressed.

13. The tangible computer-readable storage device of claim 11, wherein the operations further comprise recognizing a portion of a video stream in an internet protocol television network having video compression artifacts corresponding to a stored model.

14. The tangible computer-readable storage device of claim 13, wherein the operations further comprise synthetically generating images of objects to correct defects in a captured video scene using model-based video correction of the portion recognized.

15. The tangible computer-readable storage device of claim 11, wherein the operations further comprise delivering a corrected portion of a video stream over a low bit rate connection.

16. The tangible computer-readable storage device of claim 11, wherein the stored model comprises images of grass, faces, skies, or mountains.

17. The tangible computer-readable storage device of claim 11, wherein the operations further comprise creating a partially synthetic image of a face to correct a portion of a video stream having video compression artifacts corresponding to a stored model of the face.

18. The tangible computer-readable storage device of claim 11, wherein the operations further comprise storing a corrected video stream and forwarding the corrected video stream to a mobile phone.

19. The tangible computer-readable storage device of claim 11, wherein the operations further comprise storing a corrected video stream at a set top box in an internet protocol television network and forwarding the corrected video stream to a mobile phone.

20. A media processor, comprising:
   a memory to store instructions; and
   a controller coupled to the memory, wherein responsive to executing the instructions, the controller performs operations comprising:
      recognizing a portion of a video stream in an Interactive TV network having video compression artifacts corresponding to a stored model, the stored model including an image or a video model of an image background; and
      performing model-based video correction of the portion recognized using synthetically generated images of objects to correct defects in a captured video scene,
      wherein the model-based video correction corresponds to synthetic replacement of the artifacts according to a stored model of replacement images, and
      wherein the controller recognizes, within a captured video, a predetermined amount of compression artifacts for a portion of video for an object having a stored corresponding model for the object.

21. The media processor of claim 20, wherein the operations further comprise delivering the corrected portion of the video stream over a low bit rate connection.

22. The media processor of claim 20, wherein the operations further comprise storing the corrected portion of the video stream, combine the corrected portion with a remaining portion of the video stream to form a corrected video stream, and forward the corrected video stream to a mobile phone.

23. The media processor of claim 20, wherein the operations further comprise creating a partially synthetic image of an object to correct a portion of a video stream having video compression artifacts corresponding to a stored model of the object.

24. The media processor of claim 20, wherein the operations further comprise creating unrecognizable but visually acceptable synthesized images of objects in a background of a video share stream.

25. A server, comprising:
   a memory to store instructions; and
   a controller coupled to the memory, wherein responsive to executing the instructions, the controller performs operations comprising:
      recognizing within a captured video, a predetermined amount of compression artifacts for a portion of video for an object having a stored corresponding model for the object, the stored model including an image or a video model of an image background; and
      synthesizing the portion of the video using model-based video correction according to a stored model of replacement images,
      wherein the model-based video correction corresponds to synthetic replacement of the artifacts according to the stored model of replacement images.

* * * * *